Patented Dec. 1, 1942

2,303,370

UNITED STATES PATENT OFFICE 2,303,370

POLY-ALKYLOL KETONES AND DERIVATIVES, AND PROCESS OF MAKING SAME

Joseph H. Kugler, Howard C. Brinker, and Robert J. McCubbin, St. Paul, Minn., assignors to Minnesota Mining & Manufacturing Company, St. Paul, Minn., a corporation of Delaware No Drawing. Application May 6, 1939,
Serial No. 272,294

7 Claims. (Cl. 260—594)

The present invention relates to new materials and new processes of manufacture applicable thereto.

Among the new materials particularly contemplated are those of a syrupy character, e. g., having a consistency somewhat of the order of glycerine, and those of more viscous or resinous consistency or character. Especially contemplated products are those which may be prepared from mixtures of ketones and aldehydes, e. g., acetone and formaldehyde, by following processes as hereinafter described or the like.

While others have heretofore suggested certain methods for reacting aldehydes and ketones to obtain certain types of reaction products, yet no one, so far as we are aware, ever produced a product of the nature of the preferred product of our invention, nor one having the uses of our product. Whether our preferred product differs from prior known materials primarily because of a different isomeric arrangement of the molecules or because of different molecular weights or otherwise, thereby accounting for decidedly different physical or chemical properties, or whether still other factors contribute in a significant and important way to the differences, is not known with absolute certainty. However, regardless of theory, the product of this invention has properties and uses not possessed by materials heretofore known to us. Furthermore, the processes of the present invention possess important advantages and differences over known processes heretofore employed, for example in reacting aldehydes and ketones.

It is an object of our invention to provide materials different from those heretofore known and which, as a result, have new uses. Another object is to provide a method or process having new and advantageous features. A further object is to prepare a material economically which can be used, for example, in place of glycerine and other materials to provide superior results. These and other objects and advantages will appear from the application taken as a whole.

One specific preferred product of the present invention, which for the sake of brevity may be referred to as "Ketanol," has a specific gravity substantially the same as that of glycerine, namely, about 1.25, and also has a refractive index very similar to that of glycerine, viz. about 1.5 or slightly less, and also has a surface tension of the order of that of glycerine, viz. about 58 dynes per centimeter, but has a higher molecular weight than glycerine, and also has a very much higher viscosity than glycerine, viz. a viscosity of about 13,000 centipoises at 30° C. as against 800 centipoises for glycerine at the same temperature. As further distinguished from such materials as glycerine, the viscosity of "Ketanol" drops rather rapidly on the addition of small quantities of water.

The material of the type just referred to as "Ketanol" may advantageously be prepared by the inter-action of formaldehyde or para-formaldehyde with acetone, according to a process such as those hereinafter illustrated. A more viscous or somewhat different material may be prepared by reacting methyl ethyl ketone (instead of acetone) with formaldehyde or paraformaldehyde. A product comprising both a solid and a liquid results from this latter reaction. On the other hand, certain polymethylol compounds, such as the dimethylol compound of methyl isobutyl ketone, are liquids. The polymethylol compound of cyclo-hexanone is also a liquid.

The material above referred to as "Ketanol," as well as other materials above referred to, is of the class referred to as poly-methylol ketones or poly-alkylol ketones. In a sense, these materials also may be considered as a special kind of keto-alcohol. The reduction derivative of these types of materials, that is, hydrogenated keto-alcohols or hydrogenated poly-alkylol ketones, are likewise contemplated.

These poly-alkylol ketones, and particularly the material above referred to as "Ketanol," have a number of uses. They may be used to plasticize glue or gelatin, for example, in making printers' rolls, or in the making of the binder used in book binding, or in the making of Ditto mats and the like used in Ditto machines, "hectographs," etc., and for other uses where a flexible glue or protein composition or film is desired. This material may also be used in the making of explosives. For example, "Ketanol" can be easily reacted with nitric acid, in the presence of strong sulphuric acid and/or other acids or reagents, to form an explosive compound or nitrate. "Ketanol" and the like may also be used in lieu of glycerine in the treatment of tobaccos and their use obviates the production, during smoking, of the undesirable or poisonous acrolein which occurs when glycerine is used.

Products of this invention, e. g. "Ketanol" and related compounds, also have many other uses and important applications which we have discovered. "Ketanol" and the like may be used as an embalming fluid, e. g., in water solution, without any added formaldehyde and has advantages over previously used embalming fluids. Our product may be used in making gaskets; for example, a porous paper or cork material may be saturated with a water solution of glue and "Ketanol," or "Ketanol"-glycerine mixtures. In the making of flexible abrasive articles or so-called sandpaper, especially glue-bond sandpaper, our poly-alkylol compounds, e. g., "Ketanol," when added in even small quantities to the bonding material or glue mixture, renders the sandpaper more flexible and also both more water-resistant and more heat-resistant. In the making of tabbing cements our polymethylol or poly-alkylol compounds (e. g. "Ketanol") have been used with glues or other proteins and/or with resins. "Ketanol" has been used, both in combination with glue and alone, to coat or impregnate both paper and parchment and, among other functions, serves as a softening material for each.

Our poly-alkylol compounds may be used in making cosmetics. In combination with, for example, triethanolamine stearate, some mineral oil and a small amount of perfume to give the same a desired scent, "Ketanol" has been employed to make a very pleasing and desirable cosmetic, useful as a hand and face lotion.

A small amount of "Ketanol," or homologs thereof, has utility in perfume preparations, one of its advantageous functions being to hold the perfume after the water and/or alcohol, or like solvents, have all evaporated.

In rubber stamp inks and copying inks. "Ketanol" is used as a solvent for the dyes and, among other things, serves to keep them from drying out too fast. In shoe polishes and like materials, poly-alkylol compounds, of which "Ketanol" is illustrative, serve to soften the leather to which the polish is applied and also function as solvents for the dye or coloring material. "Ketanol" and the like also have utility in dying and printing textiles, e. g., as a solvent for the dyes and to improve the penetrating power thereof. Such materials have important utility as a solvent, especially for organic dyes and other organic materials.

In the making of soaps, especially fine toilet soaps, some "Ketanol" in the soap (generally emulsified therewith) improves the soap and makes the soap product more agreeable to the skin.

The products of our invention, while having many uses as such, as above exemplified, are also useful as intermediates or reactants in preparing other materials. For example, (in addition to its use in making explosives as above described) in the making of resins "Ketanol" hydrogenated, and also mixtures of this and other polyalkylol compounds, including, for example, hydrogenated dimethylol butanone, with glycerine, have been reacted with dicarboxylic acids, e. g. phthalic anhydride, maleic or malic acid, succinic acid, etc., with or without a drying (or semi-drying) oil acid such as eleostearic and/or linoleic acids, to produce resins respectively of the drying or non-drying alkyd type.

Also we have made resins by using hydrogenated dimethylol butanone in conjunction with hydrogenated monomethylol butanone. Poly-alkylol ketones, e. g. "Ketanol," have been reacted with boric acids to produce advantageous water-soluble resins. Again, dimethylol butanone (hydrogenated) has been reacted with rosin, abietic acid, or the like, for example merely by heating (or, if desired, by use of catalyst) to produce valuable ester gums.

Hydrogenated dimethylol butanone, hydrogenated "Ketanol," and various other hydrogenated mono- or poly-methylol or alkylol ketones herein contemplated, when dehydrated, e. g. by refluxing or heating in the presence of a catalyst such as iodine, sodium acid sulphate, etc., or by passing vapors of the methylol or alkylol compound over catalysts such as alumina, oxides of tungsten, etc., e. g. at temperatures of the order of 250° to 550° C., and then polymerized (polymerization occurring quite readily), yield synthetic rubber materials, which may be transparent and which contain, for example, a butadiene type of grouping but differ from natural rubber in important respects including resistance to attack by various liquids and solvents.

When made alkaline and subjected to elevated temperatures, "Ketanol" and related compounds may be used in the production of various solids, for example, porous and/or friable solids having utility as insulating material, as a sound deadener, etc. "Ketanol" may also be employed for a wide variety of uses as a substitute, in whole or in part, for glycerine and glycols. Certain of these and other special compositions comprising or derived from "Ketanol" and the like will be described in still further detail later.

The above are only illustrative of the many uses which "Ketanol" and the related products of our invention have, and other uses thereof within the scope of the present application are contemplated.

Processes employed according to our invention for producing "Ketanol" and like products may be either of the batch type or of the continuous type. The continuous process of manufacture has a number of advantages, especially so when large quantities of such material are desired. However, batch methods have been employed with success and important provisions and controls of our process will be better understood by consideration both of batch and continuous processes.

One batch method which has been employed with success in preparing a poly-alkylol ketone of the present invention, viz. "Ketanol," is as follows:

Mix 320 pounds of acetone with 800 pounds of a 37.5 per cent aqueous solution of formaldehyde. It will be seen that this is approximately, though not exactly, one mol of acetone to two mols of formaldehyde. These reactants may be mixed together in a glass lined reactor or vessel, e. g. a Pfaudler reactor, having a cooling jacket or cooling coils. The charge is cooled to about 60° F. Then 3.2 pounds of potassium hydroxide, dissolved in an equal weight of distilled water, may be added. This raises the pH of the mixture to approximately 11.1 and the reaction between the acetone and the formaldehyde is started. The rate of flow of cooling water, which may be passed through the jacket or coils, as the case may be, is adjusted so that the temperature of the mixture rises about 8° to 10° F. in three and one-half to four and one-half hours. The reaction is most exothermic after it has been under way about three or four hours or so and consequently the rate of flow of cooling water must be increased at such times to prevent the temperature from rising above 70° F., or thereabouts. That is, it is preferred to maintain the temperature at about 70° F. at this point. At this time the pH of the mixture will be about 11.3 but, at about this point will start to drop noticeably. The maximum temperature is ordinarily reached somewhere between four and six hours after the reaction is started. The maximum temperature is preferably not more than 78° F. The highest temperature which is at all tolerable is 132° F. at atmosphere pressure, but it is definitely advantageous, in a batch process as just defined, to keep the temperature at this point down below about 88° F. and preferably down to 78° F. or lower, temperatures of 75° or 72° F. being good operating temperatures at this point in a batch process as here defined.

After this temperature rise, the batch is maintained as close as possible to about 70° F. At the end of about six and one-half hours after starting, an additional 0.4 pound of potassium hydroxide dissolved in a like weight of distilled water may be added. At the end of seven to seven and one-half hours after starting there is again added a 0.4 pound increment of potassium hydroxide dissolved is a like weight of distilled water. A like increment of potassium hydroxide solution is also added at the end of about twelve to thirteen hours after starting, this being the last addition of potassium hydroxide, or equivalent catalyst, normally required.

The pH of the mixture at this stage is approximately 11.4 to 11.5. The last addition of potassium hydroxide solution, above mentioned, is sufficient to cause the desired reaction to go to such a state of completion at the end of a total reaction time of approximately 24 hours that the remaining formaldehyde content is less than 1%, assuming that the reaction temperature is continuously maintained at approximately 70° F. and not substantialy less than such temperature. The pH of the mixture remains at about 11.4 to 11.5 throughout the reaction or twelve hours of the reaction, i. e. subsequent to the last addition of potassium hydroxide solution.

At the end of the twenty-four hour reaction time the remaining alkali may be neutralized with a 50% solution of tartaric acid in water, a sufficient quantity of the tartaric acid solution being added so as to reduce the pH of the mixture to about 5.5 or 5.6, potassium acid tartrate being precipitated. Other acids may also be used to neutralize the alkaline material. The water (and also unreacted acetone) may then be removed from the mixture by vacuum evaporation, employing a temperature of 90 to 125° F. and a relatively high vacuum such as a vacuum of 20 or, better, 25 to 28 inches of mercury. The batch, according to this particular example, contains about 44% water, more or less, because of water present in the formaldehyde solution and water added along with the potassium hydroxide. No water, or at least no appreciable amount of water, is formed by the reaction. The vacuum evaporation is continued until the batch contains approximately 17% water, or of that order. At this point the vacuum distillation or evaporation is interrupted and hydrogen peroxide, or equivalent, is added to oxidize free formaldehyde. The hydrogen peroxide may be added as a 30% solution thereof in water and should be added in an amount 10% in excess of that theoretically required to oxidize the free formaldehyde, bearing in mind that one mol of $H_2O_2$ is required per mol of $CH_2O$. Obviously the amount of hydrogen peroxide required in any given case will depend upon the particular amount of unreacted formaldehyde which remains. While the remaining free formaldehyde, as above indicated, will ordinarily be less than 1%, when analyzed by the $AgNO_3$—KCN method, whether it is present as a relatively small or large fraction of 1% will depend upon all the specific conditions which were employed in the reaction, including total time of reaction, temperatures, pH, etc. Following the addition of the hydrogen peroxide, the temperature of the mixture is raised to 180° to 190° F. for six and one-half to seven and one-half hours or until by analysis (e. g. by the potassium cyanide method) oxidation has proceeded far enough so that formaldehyde is present in the mixture only to the extent of about 0.18% or less.

Then the batch may again be subjected to vacuum evaporation, employing a relatively high vacuum such as above indicated, e. g. 25 to 28 inches of mercury until, due to the elimination or reduction in the quantity of water, the viscosity of the remaining product rises so that it is of the order of 500 centipoises at 60° C. (140° F.).

The final analysis of this product will normally show less than 0.12% of formaldehyde, and will usually show a formaldehyde content of 0.05%, 0.03%, or less. This product may contain a small amount of water, for example approximately 3 to 5% of water.

The product may then be filtered, for example in a filter press, or by use of any other suitable means, to remove any slight amount of solids or foreign matter, such as impurities which may be introduced into the mixture in small quantities, for example with reactants or catalysts and such as precipitate formed due, for example, to neutralization of alkali present at the end of the reaction.

An important and preferred condition is that the entire reaction be carried out in a non-iron apparatus, glass-lined equipment being satisfactory and being readily available. Iron in very small quantities, even in quantities as low as one part per million parts of the product just mentioned, affects the product very adversely from the point of utility thereof and causes bad discoloration of the same.

The product produced by the operation just described is illustrative of the material referred to hereinabove as "Ketanol." While "Ketanol" may and is believed by us to be composed largely, if not substantially completely, of material comprising methylol acetones or poly-methylol ketones or mixture thereof, which are preferably substantially free of formaldehyde, nevertheless the above making procedure will illustrate and identify "Ketonal" and materials comprehended by that term. The product may be and normally is (when made according to the above process) substantially water white and is of approximately the consistency of ordinary corn syrup or "Karo" and has some physical properties which are closely related to those of glycerine, for example, though it has other properties which are widely different from glycerine.

Trimethylol acetone, or at least one related compound of homologue thereof (which may be contained in "Ketanol") recognizing that different homologues of somewhat different properties exist, may be referred to as having structural formulae related to that of trimethylol acetone, which latter may be illustrated as follows:

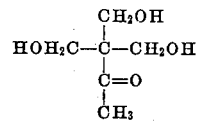

Materials having a formula of the general type of that of trimethylol actone may be represented by the following:

Where R indicates—$CH_2OH$, —$CH_2.CH_2OH$, etc., and/or H and/or alkyl groups sufficient to satisfy three valences and where R' may indicate any of such groups sufficient to satisfy three valences and will usually, though not necessarily, be different from R.

It will be understood that the above formula of trimethylol acetone is given only by way of illustration or theory and is not to be interpreted to mean that the product (or products) so designated is necessarily a constituent of our "Ketanol," nor that it or a mixture of the same with dimethylol acetone are necessarily present in large proportion therein, though they may be.

Another material which may be used according to our invention with glue, gelatine, etc., may be referred to as a methylol butanone which may be derived from methyl ethyl ketone and may have the following structural formula:

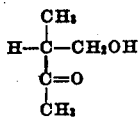

Various hydrogenated methylol ketones are also useful as plasticizers for proteins and the hydrogenated form of a methylol ketone, e. g. of the methylol butanone just mentioned, may be represented as follows:

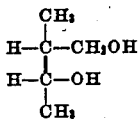

In fact the last-mentioned hydrogenated product appears to be superior to the previously mentioned material from which it may be considered to be derived.

While "Ketanol" appears to be composed largely if not substantially completely of methylol ketones such as polymethylol acetones (probably containing at least an appreciable amount of trimethylol acetone) and is substantially free of aldehydes, containing 0.5 or 0.03% or less of formaldehyde or equivalent, and possibly containing no more than 0.01% or being substantially completely free of aldehydes, and may be made by the above described method, it can also be made by other methods of which we are aware. For example, paraformaldehyde may be employed, in lieu of formaldehyde, as a reactant in admixture with acetone, thus eliminating or reducing the problem of removing water from the product.

A further method of making "Ketanol" or equivalent involves absorbing formaldehyde gas in water, fractionating and distilling methylene glycol (which is a derivative of formaldehyde) from the formaldehyde solution, the methylene glycol immediately changing into paraformaldehyde and an aqueous solution of formaldehyde. Then the paraformaldehyde mixture may be caused to react immediately with acetone in a reactor of the same type or similar to that above mentioned, e. g. a Pfaudler reactor. The water from which methylene glycol is removed by distillation is customarily used over again to dissolve further quantities of formaldehyde.

A still further method of making this product generally involves passing formaldehyde up through a bubble tower, packed tower, or equivalent, while passing acetone and alkali down through the tower. In this case the formaldehyde may be relatively free of water as compared with the 37½% formaldehyde solution described in the above procedure for making "Ketanol."

A further continuous process for making "Ketanol" involves passing a mixture of slightly more than one mol of acetone to two mols of formaldehyde through a glass tube (or a plurality of glass tubes where greater capacity is desired) which may be about 10 m. m. in diameter and is immersed in a water bath maintained at a constant temperature, e. g. 50° C. Just prior to the introduction of the continuous stream of the mixture of acetone and formaldehyde into the reacting tube, a sufficient stream of dilute KOH solution may be added so that the pH of the reactant mixture will be about 11.3. The rate of passage of reactants through the glass tube may be such that the reactants will remain in the heated reaction zone for from 3 to 10 minutes, e. g. approximately 7 minutes. The glass tube (or tube made of other suitable material) may be of any desired length but, for example, may be of the order of 150 feet in length. The product leaving the reacting tube may be allowed to stand in stainless steel, glass or nickel storage containers for some time, e. g. over night, thus causing a further reduction of formaldehyde, before the resulting material is further treated to purify the same, for example, as hereinabove illustrated.

The above described product inasmuch as it may be made from such materials as acetone and formaldehyde and paraformaldehyde may be made relatively cheaply. Acetone, as prepared by present processes, is a relatively cheap material at the present time. We have found that formaldehyde or paraformaldehyde may be provided more cheaply by making it from methyl alcohol by a catalytic operation.

Formaldehyde may also be made by the oxidation of methane:

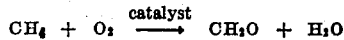

This reaction may be carried out with high yields.

While the products of our invention and the novel processes of producing the same have been described in considerable detail, other or related processes within the broad comprehension of the present invention are likewise contemplated. Also, it will be understood that the products of our invention, e. g. "Ketanol" and related polyalkylol compounds or ketone derivatives, when used in combination with protein compositions, such as glue, or when used for example in combination with "mixed acid" (sulfuric and nitric) in making explosives, or when used in lieu of glycerine, or in lieu of a portion of the glycerine, in treating tobaccos, or when employed in any of the other uses herein described or illustrated, such particular combinations are also contemplated by this invention and are broadly comprehended by this application.

When "Ketanol" is used as a softener for glue, with or without glycerine, for example in making printers' roll compositions, frequently such materials as urea, sodium bisulphite and the like may be employed in the "Ketanol" to inhibit or retard any tanning action on the glue.

While several of the characteristic properties of "Ketanol," as well as illustrative making procedures and chemical composition, have been discussed above, this material has other important properties and characteristics worthy of note in connection with the subject matter of this invention. It resembles glycerine quite closely in certain of its physical properties, including specific gravity, surface tension, solidification point, and refractive index. However it is not nearly as hygroscopic as glycerine and is much more effective in its plasticizing action on glue gels, particularly in achieving high tensile strength and high stretch, which are important properties in printers' rolls as well as in other articles where plasticized proteins or glues are employed. Also, as hereinabove indicated, when free of water, "Ketanol" has a viscosity very much greater than that of glycerine, viz. a viscosity of about 13,000 centipoises at 30° C. as against 800 centipoises for glycerine at the same temperature, but its viscosity drops rapidly on the addition of small quantities of water. "Ketanol" in its use in making printers' rolls differs remarkably from glycerine in that much less "Ketanol" than glycerine is needed for a given amount of glue to produce a given softness of finished product of desired tensile strength; that is, "Ketanol" is much more effective than glycerine in plasticizing glue. On the other hand sorbitol (which has been suggested for use in combination with other materials in making printers' rolls) is less effective even than glycerine as a plasticizer for the binder or glue and is far less effective than the "Ketanol" herein described for such purpose. This is an important consideration in view of the fact that the wearing qualities of such a printers' roll may be considered as due primarily to its content of glue or its equivalent and hence, other things being equal, it is desired to have present as high a percentage of glue, or equivalent, as possible.

To illustrate the differences and advantages of "Ketanol" as compared with glycerine as a plasticizer or modifier for glues, gelatines and the like, a number of tests were run to show comparisons between tensile strength and softness (which are important properties in various compositions, for example those used in making printers' rolls) of (1) glue plasticized with glycerine; (2) glue plasticized with a 50-50 mix of glycerine and "Ketanol"; and (3) glue plasticized with "Ketanol," all under like conditions of temperature and humidity (which are important conditions to be reckoned with in the use of printers' rolls).

For example, three different glue compositions were made up at the same time as follows: (1) glue plasticized solely with glycerine; (2) glue plasticized with a 50-50 mix of glycerine and "Ketanol"; and (3) glue plasticized solely with "Ketanol." The same percentage of plasticizer to glue was used in each of these three compositions. Each was sheeted out so that the test piece was like a strip of paper, being about 6 inches long, ½ inch wide and about .003 inch thick, each test piece being substantially identical with the other two. Each test piece was conditioned for 13 days at room temperature (about 70° F.) and 50% relative humidity. At the end of the 13 days each test piece was subjected to test for (1) stretch and (2) tensile strength and gave the results shown in the following table.

Table 1

| Plasticizer for glue | Stretch in percent of original length | Percent plasticizer to glue | Tensile strength in lbs./sq. in. |
|---|---|---|---|
| Glycerine | 270 | 60 | 300 |
| 50-50 mix of glycerine and "Ketanol" | 240 | 60 | 750 |
| "Ketanol" | 80 | 60 | 1,500 |

From the above table, it will be seen that, for equal percent of plasticizer to glue the "Ketanol" plasticized glue film was 5 times as strong as that plasticized solely with glycerine.

Two separate sets of samples were each treated for 24 hours at 140° F. and then conditioned for 13 days at 50 percent relative humidity and room temperatures and responded to tests as shown in the following two tables.

Table 2

| Plasticizer for glue | Stretch in percent of original length | Percent plasticizer to glue | Tensile strength in lbs./sq. in. |
|---|---|---|---|
| Glycerine | 60 | 50 | 250 |
| 50-50 mix of glycerine and "Ketanol" | 75 | 50 | 1,500 |
| "Ketanol" | 25 | 50 | 3,500 |

Table 3

| Plasticizer for glue | Stretch in percent of original length | Percent plasticizer to glue | Tensile strength in lbs./sq. in. |
|---|---|---|---|
| Glycerine | 45 | 70 | 100 |
| 50-50 mix of glycerine and "Ketanol" | 170 | 70 | 725 |
| "Ketanol" | 70 | 70 | 1,450 |

From comparisons shown in Table 3 it will be seen that the "Ketanol" plasticized glue composition showed decidedly greater stretch and, at the same time, many times as great strength as the glycerine plasticized glue composition or test piece.

In each of the above tables the percent plasticizer to glue was constant for each table. In the following table, the percent stretch is constant. The films tested were each aged 6 days at 10 to 20 percent relative humidity, then heated for 24 hours at 140° F. and conditioned for 24 hours at 10% relative humidity and room temperature.

Table 4

| Plasticizer for glue | Stretch in percent of original length | Percent plasticizer to glue | Tensile strength in lbs./sq. in. |
|---|---|---|---|
| Glycerine | 175 | 87 | 275 |
| 50-50 mix of glycerine and "Ketanol" | 175 | 93 | 875 |
| "Ketanol" | 175 | 137 | 1,250 |
| Glycerine-tanned glue | [1] 90 | 80 | 100 |

[1] Never over.

The above tables showing the difference between glue plasticized with "Ketanol" and with glycerine are simply included for the purpose of illustrating the novel and unusual characteristics of the product of our invention and are not to be construed as in any way limiting the use of our product to the plasticizing of proteins or glues. Our product has many other uses as above referred to. However, in connection with the use of "Ketanol" as a softener for glues, it should be observed that the contrast between "Ketanol"-plasticized glue and glycerine-plasticized glue would be still greater if the plasticizing compositions were allowed to age for a longer period. That is, "Ketanol"-plasticized glue ages very much better than glue plasticized with glycerine alone. Glue plasticized with glycerine alone, as was heretofore the custom in making printers' roll compositions, became crumbly like art gum after a few months whereas glue plasticized with "Ketanol" (which is useful in making printers' rolls), not only does not become crumbly with age, but its ability to take ink and to apply it properly to the type seems, if anything to improve with age.

In connection with the detailed procedure for making "Ketanol," given hereinabove, the following additional points may be helpful in understanding reasons for the various controls and features of the process:

(a) The reaction temperature must be kept suitably low to get desired results in a batch and ordinarily should not be allowed to go higher than about 85° F. at any time in a batch process. After that higher temperature can be used. Higher temperatures of course may be used when super-atmospheric pressures are used. One reason for this is that the reaction is so strongly exothermic that it becomes very difficult to control if the reactants are allowed to rise to higher temperatures. However, where a continuous process is employed, as hereinabove described, temperatures up to about 130° F. may be employed at atmospheric pressures; also higher temperatures, with either liquid phase, vapor phase or mixed phase condition of the reactants, are contemplated.

(b) The pH must be controlled within fairly narrow limits. The reaction will not proceed at all, or at least not at any appreciable rate, unless the pH of the mixture is above about 11. A pH of about 11.2 is preferable where a temperature of approximately 70° F. is employed, as in a batch process, although a satisfactory operation may be had at this temperature where the pH is controlled between, for example, 11.1 and 11.6. In a batch process the catalyst should be added in increments (or gradually) because, even at operating temperatures such as 70° F., some alkali is apparently used up in some side reaction, such as the Cannizzaro reaction. Consequently, in order to keep the pH within desired limits, alkali must be added from time to time to compensate for this loss. On the other hand, if it were attempted to add all of the alkali needed at the beginning of a batch process, desired results would not be obtained and a dark colored product would result rather than the desired product of this invention. A pH higher than about 11.6 should be avoided even at temperatures as low or lower than 75° F., and a still lower pH is sometimes preferable if temperatures above 75° F. are employed. Where a continuous process for making "Ketanol" is employed, of course the alkaline material, e. g. KOH, is ordinarily continuously added to the stream or mixture of reactants in such amount that the reactant solution has a pH between 10.6 and 11.3, a pH of about 11.1 to 11.3 being advantageous in commercial production.

(c) At the end of the reaction the pH of the mixture should be adjusted to less than 7, and preferably between 5 and 6. This is necessary prior to heating the mixture for the removal of water and/or reaction with sodium hydroxide or equivalent, because the "Ketanol" is unstable at elevated temperatures such as used in the vacuum dehydration when under alkaline conditions. In fact at high temperatures and under strongly alkaline conditions, this product is violently reactive and forms resinous solids, which are normally highly porous, and may be employed as insulation, filler material, or the like.

(d) The acetone and formaldehyde or equivalent are mixed before adding the catalyst, e. g. the potassium hydroxide. If the alkali is added to the acetone alone, bad discoloration results. On the other hand, if the alkali is added to the formaldehyde alone, this results in a disadvantageous initial reaction (possibly a Cannizzaro) reaction. However, if the alkali is added to the mixture of formaldehyde and acetone under suitable conditions as herein illustrated, no discoloration results and the desired reaction proceeds. By operating according to the detailed procedure for making "Ketanol" hereinabove set forth, yields of almost 100% of "Ketanol" are attainable, yields of the order of 80% being common in the commercial operation of our invention where conditions of operation are not precisely controlled to those which are theoretically ideal. The unreacted acetone and formaldehyde account for the 20% missing from the commercial product. These unreacted materials can be recovered, especially the acetone which latter is separated from the remaining "Ketanol," for example, in the vacuum evaporation step of purification.

(e) While the catalyst, e. g. the potassium hydroxide, is described as being neutralized with an organic acid, though this is a safe and advantageous procedure, mineral acids such as sulphuric or hydrochloric acids may be employed while still avoiding discoloration or unfavorable consequence as a result thereof.

(f) No additional water is or need be added to the reactants (other than the water present in the formaldehyde solution and in the KOH solution) and it is desired to carry out the reaction in as concentrated a state as possible. Such water as is present is removed, when the formaldehyde and acetone are substantially completely reacted, by the use of vacuum evaporation, evaporation under a vacuum being desirable to avoid any deterioration in the quality of the "Ketanol," especially when in alkaline condition. Vacuum evaporation obviates the need for the higher temperatures required for atmospheric pressure evaporation; such higher temperatures are disadvantageous.

(g) Glass or glass-lined equipment, or equipment made of or lined with stainless steel, nickel or earthenware, or equivalent, is desired to avoid contamination by iron or certain other metals. If desired, the entire apparatus could be made of glass or other material which will not contaminate the final product.

(h) By adhering to the steps of process hereinabove described, we produce a product which is substantially free of aldehydes. Several steps in the process aid us in this. We use an excess of acetone over the theoretical one mol of acetone to two mols of formaldehyde. Any remaining formaldehyde is further reduced by oxidizing it with hydrogen peroxide or equivalent. This final aldehyde content is usually less than 0.1%. This is important in using the "Ketanol" in making printers' rolls or compositions where similar characteristics are desired because if a large amount of aldehyde, e. g. about 2 percent, were present in the "Ketanol" and the latter then used with glue in making printers' rolls, the glue would gel up almost immediately. On the other hand, when the product is produced as herein described (the "Ketanol" having a very low aldehyde content), it becomes possible to hold glue-"Ketanol" mixtures at temperatures as high as 170° F. for one or two hours or so without any appreciable tanning of the glue.

Other chemicals beside hydrogen peroxide which have been used in arriving at "Ketanol" of suitably low aldehyde content are sodium bisulphite (which forms an addition compound with aldehydes) and urea (which latter forms an insoluble precipitate with aldehydes under acid conditions) and also ethyl or methyl acetoacetic ester.

While the invention has been described and illustrated to an important degree by "Ketanol" (e. g. keto-alcohols or derivatives, or methylol ketones or poly-methylol acetones or the like), for example in plasticizing proteins, making explosives, treating tobacco, etc., it will be understood that this invention is not so limited but, in addition to "Ketanol" or the like, contemplates the use of homologs thereof, or kindred compounds having hydroxy groups and similar characteristics, other keto-alcohols and hydrogenated keto-alcohols, including alkyl and/or aryl substituted compounds, e. g. hydrogenated monomethylol acetone, $CH_3 \cdot CHOH \cdot CH_2 \cdot CH_2OH$, or 2-methyl, 1,3-butylene glycol, $CH_3 \cdot CHOH \cdot CHCH_3 \cdot CH_2OH$, and the like, being particularly contemplated.

Where polymethylol ketones, poly-ethylol ketones, etc., and hydrogenation or reduction derivatives thereof are herein named as plasticizers for glue and the like and for other purposes, it will be understood that such materials come within the general class which may be referred to as "alkylol ketones" or "poly-alkylol ketones" and reduction derivatives thereof.

The uses of the product of this invention in connection with plasticizing of proteins and in the making of print roll compositions and the like is defined more in detail in a co-pending application of Joseph H. Kugler and William A. Vievering, Ser. No. 272,293, filed concurrently herewith.

Supplemental to discussion hereinabove given regarding the making of resins, other poly-alkylol compounds of this invention besides Ketanol have been used in making alkyds and other resins. For example, dimethylol butanone (hydrogenated) can be reacted with dicarboxylic acids and other acids, e. g. with phthalic anhydride and one or more fatty acids, preferably of the drying or semi-drying type, such as linseed oil fatty acids, to make good resins. In addition to advantages in the final resin, hydrogenated dimethylol butanone, or the like, possesses important process advantages over glycerine in making alkyd type resins. For example, oil fatty acids (e. g. eleostearic or linoleic acids) and polybasic acids such as phthalic anhydride become homogeneous or miscible with hydrogenated dimethylol butanone at a temperature less than 100° C., e. g. at about 85° C., whereas complete miscibility in the case of cooking of ordinary alkyds, i. e. where glycerine is used, is not attained until a temperature considerably in excess of 100° C. is reached, e. g. until a temperature of about 150° C. or higher is reached. Furthermore the maximum cooking temperature where dimethylol butanone (hydrogenated) is used need not exceed 185° to 195° C., and the reaction may be carried out at temperatures of the order of 125° to 175° C., whereas it is common practice where glycerine is used to complete the reaction at temperatures ranging from 225° to 250° C. The lower temperatures hereby made possible are important, e. g. because the difficulty often encountered in making ordinary alkyds (i. e. with glycerine) of getting gelation before complete esterification is minimized or avoided by use of the lower temperatures hereby made possible.

Products as herein described, for example mono-methylol butanone, which is a liquid, or other material of that nature, can be readily dehydrated, e. g. by refluxing or preferably by distilling in the presence of a catalyst such as iodine, or phosphoric acid or by passing vapors of the methylol or alkylol compound over a solid catalyst, e. g. alumina, oxides of tungsten, etc., at temperatures ranging from, for example, 250° to 550° C., to produce a vinyl compound or compounds. These vinyl type compounds or monomers (as for example those produced from substances of the class of monomethylol butanone, "Ketanol," dimethylol acetone, etc.) polymerize readily to produce excellent water-white vinyl resins, without the aid of polymerizing catalysts such as hydrogen peroxide, benzoyl peroxide, sodium perborate, acyl peroxides in general, etc., at temperatures, for example, ranging from 35° to 75° C., or the monomeric vinyl compounds may be converted to polymeric forms more rapidly and/or at lower temperatures by the use of such catalysts. Further, the above mentioned vinyl monomers may be allowed to polymerize in the presence of such solvents as acetone, various ketones, ethyl acetate and various other esters, etc., which are solvents for both the monomeric and polymeric vinyl compounds; or the polymerization may be carried out in liquids such as heptane or toluene, for example, which are solvents for the monomeric forms but non-solvents for the polymeric forms. In the latter case, the resins may be produced in the form of flaky or pulverulent masses which may be filtered from the solvent and/or the monomer.

To further illustrate uses of materials herein described in making vinyl resins, synthetic rubbers and the like, materials as herein described, for example monomethylol butanone may be combined with hydrogen cyanide to produce polyhydroxy nitriles. These latter materials can be dehydrated, for example by use of suitable dehydrating agents such as certain metal oxides, salts or acid anhydrides, chosen for example from those hereinabove mentioned, and at elevated temperatures, to produce cyano, alkyl substituted butadienes or monomers capable of forming improved synthetic rubbers. Such butadiene derivatives or monomers may be polymerized per se, or they may first be converted into desired esters, acids or amides by employing the desired reagent to react with the cyano grouping contained therein and then the resulting conversion product may be polymerized. Polymers of the aforementioned butadiene derivatives or monomers (for example, polymers of 2-cyano, 3-alkyl butadienes, or derivatives thereof) are characterized by such inherent qualities as resilience, elasticity, toughness, and resistance to fluid attack, but these properties may be varied within wide limits, depending upon the particular chosen treatment (e. g. reaction with the cyano group before polymerization) as illustrated above. Depending upon the particular chosen treatment, the ultimate product or rubbery masses may be sheeted out into thin pliable films or sheets or subjected to other methods of manufacture, or by suitable treatment, as illustrated, result in materials, e. g. of a fibrous nature, which can be extruded or drawn into thread-like forms suitable for weaving and the like. It is not intended that the aforesaid reactions carried out upon such hydroxy or polyhydroxy nitriles shall be construed as limiting but rather as illustrations of contemplated processes and methods of manufacture.

The nitriles above mentioned (produced, for example, by reacting alkylol or methylol compounds, e. g. monomethylol butanone or "Ketanol," or the like, with HCN) may be described as hydroxy or polyhydroxy nitriles and also as branched chain hydroxy or polyhydroxy nitriles. These materials lend themselves to a number of important reactions due to both the "OH" and the "CN" groups. For example, when dehydrated or otherwise reacted to produce substituted butadiene compounds, the character of the resulting compounds are controlled or influenced by these groups and by the branched chain of the nitrile reactant. While straight chain hydroxy nitriles, per se, have been known for some time, the branched chain hydroxy and polyhydroxy nitriles, as herein illustrated, possess important differences and make possible new processes and the production of new products. For example, the following is illustrative of nitriles heretofore known:

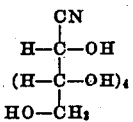

Whereas a nitrile as hereinabove illustrated may, for example, be represented as:

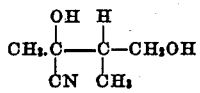

To illustrate further uses of products herein described, hydrogenated "Ketanol" or hydrogenated dimethylol acetone, or compounds of analogous molecular structure, may be dehydrated to form alkylol or methylol butadienes which, after polymerization, have, for example, a molecular structure which may be illustrated as follows:

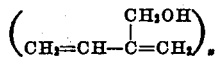

where $x$ represents some digit in excess of unity. It is conceived that the methylol group (i. e. —CH$_2$OH group) of the above butadiene molecule may be an important contributing factor to the toughness of the product. The modified butadiene monomers (produced, for example, by dehydrating hydrogenated dimethylol acetone or by dehydrating hydrogenated "Ketanol") polymerize spontaneously upon standing, for example for a day more or less to a few weeks, to form a soft and/or transparent rubbery mass. A generally similar butadiene compound can be obtained by chlorinating hydrogenated monomethylol butanone to form a compound which may be

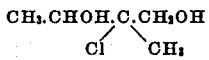

or have some comparable structure, and then treating the latter, to remove H$_2$O and HCl, for example by use of a suitable dehydration and reduction agent or agents, either in one or in a plurality of steps, thus producing a compound which, before polymerization, may have the formula:

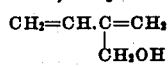

If only H$_2$O is removed from the above mentioned chlorination product of hydrogenated monomethylol butanone, a vinyl type product results which appears to have the formula:

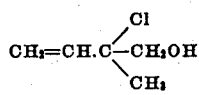

whereas if such product is reacted so that only HCl is eliminated therefrom, a different vinyl type material is made which may have the formula:

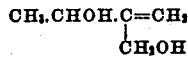

Another important use of compounds made according to the present invention is illustrated by considering methods which have hertofore been employed in making polyvinyl acetals, butyrals, etc. There it is customary to start with vinyl acetate and then polymerize the same, secondly hydrolize the polymer to make polyvinyl alcohol, and thirdly treat the polyvinyl alcohol with the suitable aldehyde to produce the desired formal, acetal, etc. As contrasted with this, methylol or alkylol compounds such as monomethylol butanone may be dehydrated to form directly a compound which may have the formula,

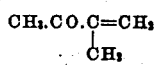

and be referred to as monomeric methyl isopropenyl ketone.

The dehydration product just illustrated may in turn be employed in other useful syntheses. For example, it may be reacted with ethylene oxide to form a reaction product composed largely of a compound which may possibly have the formula,

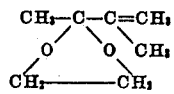

or some approximation thereof, which in the polymerized state is comparable to polyvinyl acetals, i. e. it is a polyvinyl ketal. It will be seen that such compound has an isopropenyl group

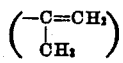

which is the group through which polymerization may be effected to produce a vinyl type resin.

Though the batch method of making "Ketanol" and the like is the first method above set forth and is described with considerable detail, this is not to be interpreted as meaning that the batch method is the most preferred method but this illustration has been so presented so as to make important or essential features of the present invention more readily apparent.

In ketone-aldehyde reactions, in general and within reason, the higher the ketone, the higher the optimum reaction temperature. On the other hand, the use of acetaldehyde or propionaldehyde in place of formaldehyde comparatively does not render as much increase in temperature desirable. However the specific conditions most suitable for a particular set of reactants may be best arrived at by trial runs made in the light of the general and illustrative teaching herein given for particular exemplary reactants.

All variations and embodiments within the scope of the present application and the appended claims are contemplated.

What we calim is:

1. The process for reacting ketones and aldehydes in the production of alkylol ketones which comprises passing a reactant mixture of an aldehyde and a ketone through a confined elongate reaction zone and maintaining said reactant mixture at an approximately constant and uniform temperature throughout its passage through said confined elongate reaction zone by maintaining a heat exchange liquid in intimate heat exchange relation with said elongate reaction zone throughout its length, said temperature being below but approaching the maximum temperature permissible while maintaining the reactants of said mixture substantially completely in the liquid phase therein, said reactant mixture containing alkaline material in sufficient amount to maintain the pH of said mixture at approximately 10.5–11.5 throughout its passage through said elongate reaction zone, the time of passage of said mixture through said elongate reaction zone being approximately 3–10 minutes, whereby the said aldehyde and ketone reactants are converted to the extent of at least approximately 80 percent to alkylol ketones and further conversion of residual aldehyde and ketone reactants, in the fluid leaving said elongate reaction zone, taking place at room temperatures without any substantial rise in temperature thereof, the aforesaid aldehyde being a lower aliphatic aldehyde and the aforesaid ketone having a plurality of hydrogen atoms in alpha position to the carbonyl group.

2. A continuous process for producing polyalkylol ketones by reacting a lower aliphatic aldehyde with a ketone having a plurality of hydrogen atoms in alpha position to the carbonyl group which comprises continuously forming a mixture of said ketone and said aldehyde and an alkaline solution, said ketone being present in said mixture to the extent of slightly more than one mol to two mols of said aldehyde, and said alkaline solution being present therein in sufficient amount to maintain the pH of said mixture at approximately 10.5 to 11.5 throughout the reaction period; immediately upon the formation of said mixture, passing the same through a confined elongate reaction zone out of contact with, but in intimate heat exchange relation with a heat exchange liquid, said heat exchange liquid being maintained at a substantially constant temperature, below that at which it is desired to maintain said mixture of reactants during the passage thereof through said elongate reaction zone, said mixture of reactants being maintained at a temperature at least slightly but not greatly below that at which any substantial proportion of either of said ketone and aldehyde reactants would boil out of the particular reactant mixture above specified, thereby to maintain said reactant mixture at an approximately constant and uniform temperature throughout its passage through said confined elongate reaction zone, the length of said elongate reaction zone and the rate of passage of the reactant mixture therethrough being such that the total reaction time in said reaction zone is not greater than approximately 10 minutes.

3. A continuous process for producing alkylol ketones by reacting a lower aliphatic aldehyde with a lower ketone having a plurality of hydrogen atoms in alpha position to the carbonyl group which comprises continuously mixing an aqueous alkaline solution with a preformed mixture of said ketone and said aldehyde, said ketone being present in the mixture to the extent of at least one mol thereof to two mols of said aldehyde, and said alkaline solution being present in sufficient amount to maintain the pH of the reacting mixture within the range of 10.5 to 11.5 throughout the reaction period; immediately upon the addition of said alkaline solution to said ketone and aldehyde reactant mixture, passing the same through a confined elongate reaction tube, out of contact with, but in intimate heat exchange relation with a bath of heat exchange liquid, and maintaining the temperature of the reactant mixture during its passage through said reaction tube at approximately 110°–130° F., said heat exchange liquid being maintained at a temperature below but not greatly below the reaction temperature desired within said reaction tube, the length of said elongate reaction tube and the rate of passage of the aldehyde-ketone reactant mixture therethrough being such that the total reaction time in said elongate reaction zone is not greater than approximately ten minutes, said reaction tube being composed of a material substantially inert to the reactants passing therethrough.

4. A continuous process for producing a mixture of dimethylol acetone and monomethylol acetone which is substantially free from aldehydes and in which the alkylol ketone product is composed predominantly of dimethylol acetone and to a minor extent of monomethylol acetone, said process comprising mixing an aqueous alkaline solution with a mixture of acetone and an aqueous solution of formaldehyde, said acetone being present to the extent of slightly more than one mol to two mols of said aldehyde in said mixture and said alkaline solution being present in sufficient amount to maintain the pH of the reactant mixture within the range of 10.5 and 11.5 throughout the reaction period; immediately upon the formation of said mixture, passing the same through a confined elongate reaction zone out of contact with but in intimate heat exchange relation with a heat exchange liquid, said reactant mixture being maintained at a temperature of approximately 110°–130° F. during its passage through said elongate reaction zone, said temperature being maintained at all times by maintaining said heat exchange fluid at a temperature slightly below the desired temperature of said reactant mixture, the length of said elongate reaction zone and the rate of passage of the reactant mixture therethrough being such that the total reaction time in said reaction zone is from 3 to 10 minutes.

5. The process as defined in claim 3 further characterized in that the alkaline solution employed consists substantially of an aqueous KOH solution, said KOH solution being employed in sufficient proportion in relation to the aldehyde ketone reactant mixture so as to maintain the pH thereof at approximately 11.1 to 11.3, and the temperature of said reactants during their passage through said elongate reaction zone being approximately 130° F.

6. A mixed product produced according to the process of claim 2, said product comprising a mixture of mono- and di-alkylol ketones and a trace of aldehyde, said aldehyde being present to the extent of less than 0.05 of 1%, and said product being a clear, substantially colorless syrup-like material.

7. A mixed product produced according to the process of claim 4, further characterized in that it consists substantially of dimethylol acetone and monomethyl acetone together with a trace of aldehyde, said aldehyde being present to an extent not greater than 0.05 of 1%, and said dimethylol acetone being present in substantially greater proportion than said monomethylol acetone, said mixed product being a clear, substantially colorless syrup-like material having a specific gravity, surface tension and refractive index approximating that of glycerine, but having an average molecular weight substantially higher than the molecular weight of glycerine and also having a viscosity in the anhydrous state, and at 30° C., much greater than that of glycerine.

JOSEPH H. KUGLER.
HOWARD C. BRINKER.
ROBERT J. McCUBBIN.

CERTIFICATE OF CORRECTION.

Patent No. 2,303,370.                                December 1, 1942.

JOSEPH H. KUGLER, ET AL.

It is hereby certified that error appears in the printed specification of the above numbered patent requiring correction as follows: Page 4, first column, line 37, for "0.5" read --0.05--; page 8, second column, line 25, for that portion of the formula reading "$CH_3-C-C=CH_3$" read --$CH_3-C-C=CH_2$--; line 60, for "calim" read --claim--; and that the said Letters Patent should be read with this correction therein that the same may conform to the record of the case in the Patent Office.

Signed and sealed this 26th day of January, A. D. 1943.

(Seal)

Henry Van Arsdale,
Acting Commissioner of Patents.